United States Patent [19]

Neitzel

[11] Patent Number: 4,791,783
[45] Date of Patent: Dec. 20, 1988

[54] CONVERTIBLE AIRCRAFT ENGINE

[75] Inventor: Robert E. Neitzel, Marblehead, Mass.

[73] Assignee: General Electric Company, Lynn, Mass.

[21] Appl. No.: 325,156

[22] Filed: Nov. 27, 1981

[51] Int. Cl.$^4$ ............... F02K 1/38; F02K 1/46; F02K 3/02
[52] U.S. Cl. ................... 60/262; 60/226.3; 60/39.33
[58] Field of Search ......... 60/39.33, 226 R, 226 B, 60/262, 263, 39.07, 39.161; 244/7 R

[56] References Cited

U.S. PATENT DOCUMENTS

| | | | |
|---|---|---|---|
| 2,803,943 | 8/1957 | Rainbow . | |
| 3,025,025 | 3/1962 | Düttmann | 244/62 |
| 3,108,767 | 10/1963 | Eltis et al. | 60/262 X |
| 3,118,276 | 1/1964 | Keenan et al. . | |
| 3,351,304 | 11/1967 | Stein et al. | 244/17.19 |
| 3,377,804 | 4/1968 | Wright et al. | 60/262 |
| 3,487,993 | 1/1970 | Rannenberg | 60/39.07 |
| 3,638,428 | 2/1972 | Shipley et al. . | |
| 3,678,690 | 7/1972 | Shohet et al. | 60/39.33 X |
| 3,777,489 | 12/1973 | Johnson et al. . | |
| 4,010,608 | 3/1977 | Simmons | 60/226 R |
| 4,043,121 | 8/1977 | Thomas et al. | 60/204 |
| 4,068,471 | 1/1978 | Simmons | 60/262 |
| 4,075,833 | 2/1978 | Sargisson | 60/262 |
| 4,085,583 | 4/1978 | Klees | 60/262 X |
| 4,222,235 | 9/1980 | Adamson et al. | 60/226 R |
| 4,254,619 | 3/1981 | Giffin, III et al. | 60/226 B |

FOREIGN PATENT DOCUMENTS 2157611 11/1972 Fed. Rep. of Germany .
2328460 1/1975 Fed. Rep. of Germany .
1175376 12/1969 United Kingdom .
1251312 10/1971 United Kingdom .
1308400 2/1973 United Kingdom .
1493049 2/1975 United Kingdom .
1439988 6/1976 United Kingdom .
2005356 4/1979 United Kingdom .

OTHER PUBLICATIONS

I'Anson, "High By Pass Ratio Compound Fan-Shaft Engines . . . ", *ASME*, Mar. 1969.

*Primary Examiner*—D. E. Stout
*Attorney, Agent, or Firm*—Francis L. Conte; Derek P. Lawrence

[57] ABSTRACT

A convertible aircraft engine, capable of turboshaft and/or turbofan modes of operation, is provided in a configuration that combines certain components to permit variation in bypass flow to match engine airflows with the mode of engine operation. The provided components permit the engine to decrease the power requirements of the engine's forward fan when the engine is operated in the turboshaft mode. To permit a decrease in fan power requirements, the fan is split into an outer portion and an inner portion separated by a rotating shroud. Airflow into the fan's outer portion is controlled with a part span inlet guide vane and an outlet guide vane. The guide vanes can be used to lessen the load on the outer portion of the fan while the inner portion continues to accelerate and compress a normal airflow into an engine compressor for supplying the engine's core. The power normally used to drive the fan outer portion is used instead to power a transfer shaft in the turboshaft mode.

11 Claims, 1 Drawing Sheet

CONVERTIBLE AIRCRAFT ENGINE

BACKGROUND OF THE INVENTION

This invention relates to aircraft gas turbine engines that are capable of conversion from turbofan to turboshaft modes of operation and vice versa.

Considerable attention has been directed at various efforts to develop an aircraft engine that is capable of both turbofan and turboshaft operation. Commonly referred to as convertible aircraft engines, powerplants that have been conceived with this dual capability would be desirable for powering an aircraft in a vertical direction as a helicopter and alternatively for powering an aircraft in a forward direction as a typical turbofan-powered jet. The obvious advantage of dual mode operation is that the aircraft could take off and land like a helicopter but could also fly forward at relatively high speeds like a jet-powered airplane.

One example of a convertible engine concept is disclosed by W. J. Stein et al in U.S. Pat. No. 3,351,304. As evidenced by this disclosure, W. J. Stein et al conceived an aircraft powered by turbofan engines that are connected to a helicopter-type, vertical-lift rotor by a primary gear train with appropriate reduction gearing. The engine additionally has a secondary gear train, which, when actuated, motors the rotor at lower r.p.m. to reduce resistance during turbofan-powered forward-thrust operation with a manually operated clutch to selectively actuate either the primary or secondary gearing. The gearing and shifting arrangement permits the speed of the fan to be modulated through the gear ratios. The advantage is that in one phase of flight operation the engine is turning the fan at low r.p.m., thereby permitting a major part of the engine power to be delivered as a shaft horsepower to the rotor system, while at the same time restricting the thrust produced by the fan to a low level. In the alternate phase of operation, the gearing permits the fan speed to be increased while at the same time limiting the amounts of shaft horsepower diverted to the rotor system.

As might be expected, this type of system tends to be inefficient because the engine thermodynamics do not match the actual engine cycle. Also, the requirements of the gearing and clutching system are extreme and would require large and heavy equipment that is undesirable in aircraft applications.

Since the time period of the Stein et al invention, numerous technical advances have been made in the area of multi-cycle aircraft engines. Some of these advances permit variable bypass operation of a turbofan engine. This new technology has fostered innovations relating variable bypass system applications to convertible-type engines.

SUMMARY OF THE INVENTION

Therefore, it is an object of the present invention to provide a convertible engine that is capable of powering an aircraft forward like an airplane or in a lifting mode like a helicopter in an efficient manner without the use of massive gearing and clutching systems.

It is another object of the present invention to provide a convertible engine that varies bypass flow for the purpose of providing a lesser bypass airflow during turboshaft operation and a greater bypass airflow during turbofan operation to match the actual engine cycle with operational requirements of the aircraft.

Briefly stated, these and other objects are attained in a convertible turboshaft/turbofan engine arrangement that combines certain components that permit variation in bypass flow in an engine that has a transfer shaft for providing shaft horsepower to an external location, such as a helicopter rotor. This combination of components allows the engine to effectively decrease the power requirements of the engine's forward fan when the power requirements of the transfer shaft are increased.

A decrease in fan power requirements is accomplished with a split fan having an outer portion and an inner portion separated by a rotating shroud. Airflow into the fan's outer portion is controlled with a part span inlet guide valve (IGV). This part span IGV can be used to lessen the load on the outer portion of the fan while the inner portion continues to accelerate and compress a normal airflow into an engine compressor for supplying the engine's core. The power normally used to drive the fan outer portion is used instead to power the transfer shaft. Notably, even when the guide vanes are completely closed, there will always be some bypass flow. Regardless of IGV position, the bypass flow is mixed with the core engine flow in an engine tailpipe with a chute-type mixer. The mixing of flows improves specific fuel consumption during turbofan operation and cools the exhaust to lessen infrared signature out the engine's exhaust nozzle during turboshaft operation. Compared to a separated exhaust system, the mixed exhaust system in a closed IGV mode reduces the back pressure on the low pressure turbine, thereby increasing the shaft power available and reducing the residual thrust of primary exhaust.

BRIEF DESCRIPTION OF THE DRAWINGS

The invention may be better understood upon reading the following description of the preferred embodiment in conjunction with the accompanying drawings in which.

DETAILED DESCRIPTION

Figure 1:
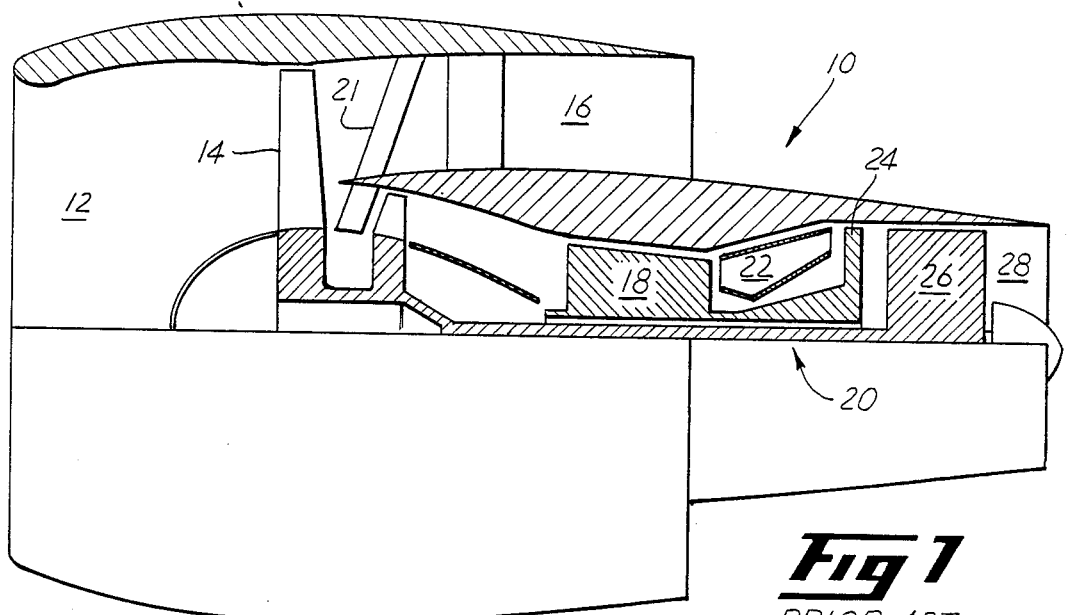
FIG. 1 is a cross-sectional view of a typical prior art turbofan engine.

Referring now to FIG. 1, a typical gas turbofan engine 10 is shown for the purpose of briefly describing its internal workings. Air enters the engine 10 at an inlet 12 that directs the air into a fan 14 for accelerating the inlet airflow. The fan 14 drives the air downstream (from left to right in FIG. 1) into both a bypass duct 16 and a compressor 18 for a core engine 20. The air entering the bypass duct 16 is used to provide a majority of the forward thrust generated by the engine 10 and is called bypass air because it bypasses the engine's core 20. An outlet guide vane 21 is provided for controlling fan airflow into the bypass duct at varying fan speeds.

The remaining portion of the inlet air that does not enter the bypass duct is directed into the compressor 18 where it is compressed to support a core engine combustion process that takes place inside the combustor 22. To create this combustion, fuel is injected into the highly compressed air in the combustor 22 and ignited to provide high-energy combustion gases that drive a high pressure turbine 24. The high pressure turbine 24 converts this extracted energy into shaft horsepower for driving the compressor 18.

A low pressure turbine 26 is disposed downstream of the high pressure turbine 24 in a position to receive the exiting flow of hot gases leaving the high pressure turbine 24. The low pressure turbine is so named because the combustion gases have dropped in pressure somewhat after part of their energy has been dissipated in the high pressure turbine. Additional energy is extracted by the low pressure turbine from the combustion gases, again for conversion into shaft horsepower, but this time to drive the fan 14.

From the low pressure turbine 26, the core engine combustion gases flow into an engine exhaust 28. An alternate approach would be to provide a long fan duct and mixing section where the bypass flow can be mixed with the core engine exhaust flow to increase engine efficiency.

The engine 10 in FIG. 1 is a good example of a typical turbofan engine used to propel aircraft in a forward direction at speeds that approach Mach 1. As stated earlier, in this type of engine, the majority of the forward propulsive thrust is provided by the fan 14.

A cross section of a turboshaft type of engine used to power a helicopter aircraft would, in many ways, look quite similar to the cross section shown in FIG. 1. The major differences in a turboshaft engine would be that the fan 14 and bypass duct 16 would be eliminated, and the low pressure turbine 24, with the use of shafts and appropriate gearing, would power a helicopter rotor to lift the aircraft instead of a fan to drive the aircraft forward.

Figure 2:
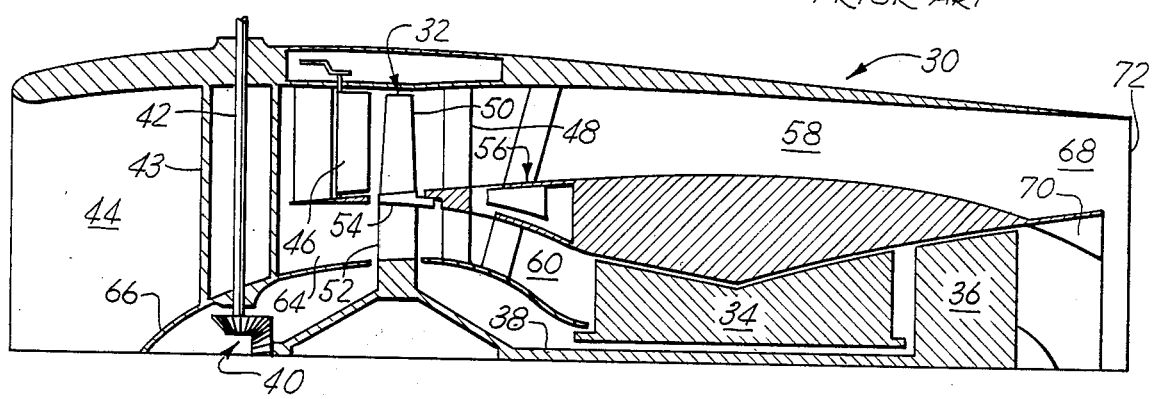
FIG. 2 is a cross-sectional view of one embodiment of a gas turbine aircraft engine incorporating the present invention.

Referring now to FIG. 2, a convertible engine 30 is shown that has been conceived for the purpose of providing a gas turbine engine that is capable of exclusively turbofan or exclusively turboshaft operation or both simultaneously. This powerplant is intended to supply the right amount of shaft horsepower to the helicopter rotor for liftoff and landing and, additionally, be convertible to a turbofan mode of operation for forward flight when the helicopter is unloaded.

The convertible engine 30 is provided with a fan 32 ahead of a core engine or gas generator 34 in a configuration similar to that of existing turbofan engines. A low pressure turbine 36 supplies power to the fan 32 through a low pressure turbine shaft 38 mounted concentrically to the gas generator 34.

A bevel gear set 40 is provided on this same shaft 38 for the purpose of transferring power through a power transfer shaft 42, which is housed in a suitable strut 43 through a fan inlet 44. The power transfer shaft 42 would be mechanically connected to a main gear set and helicopter rotor (not shown). When the aircraft is flying as a helicopter, a feature of this invention is that the shaft 38 can transfer its power through the bevel gear set 40 and transfer shaft 42 to a helicopter rotor instead of to the fan 32.

Inlet guide vanes 46 are provided just downstream of the fan inlet 44 but ahead of the fan 32. The basic characteristics of guide vanes are known to those skilled in the art, and it is known that vanes can be rotated to different positions to control the volume of inlet airflow into the fan 32. When the aircraft is operating as a helicopter in a turboshaft (lift) mode of operation, the inlet guide vanes 46 can be rotated to a "closed" position to reduce the inlet airflow and thereby reduce the load on the fan 32 with the fan still rotating. This permits a majority of the mechanical power from the shaft 38 to be transferred to the helicopter rotor instead of the fan 32.

Outlet guide vanes 48 which are fixed in a conventional turbofan can be made variable as a means of further reducing the power absorbed by the fan 32.

In order to provide for additional control of the engine's airflow and thereby help increase the engine's efficiency, the fan 32 is split into an outer portion 50 and inner portion or fan hub 52. The inner and outer portions of the fan are separated by a rotating shroud 54. The inner portion 52 supercharges the engine core 34 with a compressed airflow that is separated by the shroud 54 from being affected by the airflow past the outer portion 50. The reason for this separation is that this allows the core engine supercharging and inlet flow conditions to be relatively independent of the fan inlet guide vane position. Since the vanes 46 are part span inlet guide vanes, meaning the vanes physically extend into the engine's bypass stream region only, the vane position will tend to affect the fan outer portion airflow only. The airflow that flows radially inwardly of the vanes 46 is then relatively unaffected by vane position. It has been found to be quite important to use part span inlet guide vanes to maintain reasonable airflow conditions entering the core engine 34 over the entire range of inlet guide vane angles. The shroud 54 tends to further promote this airflow separation, which generally increases the engine performance at inlet guide vane closures.

There can be some special airflow considerations with a split fan arrangement especially when matching the fan inner portion airflow with the core engine air requirements over various power settings since core engine flow will vary even though the fan speed is held constant.

Figure 3:
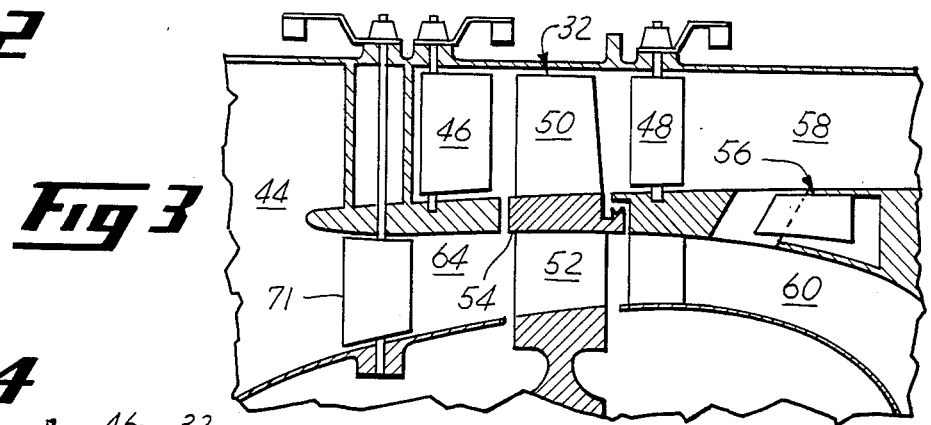
FIG. 3 is an enlarged cross-sectional view of certain components of the present invention.

Apparatus for matching airflows is shown in detail in FIG. 3. A bleed valve 56 is provided between an engine bypass duct 58 and an engine core inlet 60. By incorporating this bleed valve 56, an outlet is provided to permit redirection of excess air supercharged by the fan inner portion 52 when it is not required by the engine core 34. It is expected that bleeding of fan airflow would be required only at part power engine settings when fan speed is held at maximum levels.

Referring again to FIG. 2, it is noteworthy that an inlet 64 to the fan inner portion 52 and a centerbody housing 66 for the bevel gear set 40 can both be arranged to provide a line-of-sight separation to prevent foreign objects from entering the engine core. This line-of-sight separation is not a necessary aspect of the engine 30, but can be desirable in most practical applications.

At a downstream end of the convertible engine 30, the bypass air from duct 58 is mixed with the core engine primary exhaust flow in an engine tailpipe 68 with a chute-type mixer 70. The mixed exhaust then passes out through a fixed jet nozzle 72. In a turbofan forward flight mode of operation, the mixed exhaust provides a specific fuel consumption benefit. In a turboshaft lift mode of operation, the air that passes through the outer portion 50 of the fan 42 and becomes bypass flow will tend to dilute the primary exhaust flow. The lower temperature of the resulting exhaust out the nozzle 72 reduces the infrared signature which would especially benefit military use of the convertible engine.

This mixed exhaust arrangement offers another advantage. In the turboshaft mode of operation, back pressure on the low pressure turbine 36 is reduced when the bypass flow is reduced by closing the inlet guide vanes 46. This increases the power output of the convertible engine 30 and reduces the residual thrust of the engine. Residual thrust is generally undesirable in the turboshaft mode of operation. It has been suggested that, without the mixed exhaust, a variable primary nozzle might be required to reduce this residual thrust to acceptable levels.

A modification that can be made to the embodiment shown in FIG. 2 is an addition of an inner part span, variable inlet guide vane 71 positioned forward of the fan inner portion 52. This additional inlet guide vane would control airflow intended for the engine compressor 34 and will assist in matching the fan inner portion airflow to the core engine requirements. This optional modification is shown in FIG. 3 but not in FIG. 2.

Figure 4:
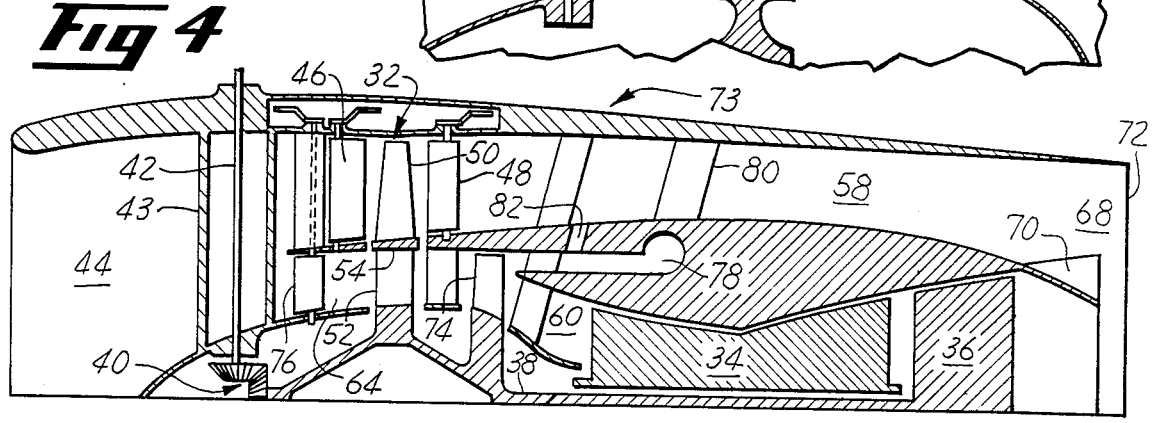
FIG. 4 is a cross-sectional view of a gas turbine engine incorporating an alternate embodiment of the present invention.

Referring now to FIG. 4, an alternate embodiment of the present invention is shown in cross section to aid in comparison with the embodiment shown in FIG. 2. The additional features shown in FIG. 4 include a booster stage 74 driven by the low pressure shaft 38. The booster stage 74 is needed if the fan hub cannot produce enough pressure ratio for the purpose of compressing the flow from the fan hub 52 to the level required by additional aircraft systems that require compressed air, such as a vehicle rotor circulation control system.

In explanation, some of the new aircraft concepts that have recently been conceived use aircraft wings as both a rotary blade for lifting the aircraft and as a fixed wing when the aircraft flies like a jet. Compressed air is required to provide circulation control of the wing. This air could be provided by a separate compressor but there may be a net saving if the air is supplied by the main engine.

The fan hub 52 and booster stage 74 are sized to supply air to both the engine core 34 and the vehicle wing or rotor (not shown). An additional inner variable inlet guide vane 76 ahead of the fan hub 52 is provided to assist in matching the airflow characteristics of the fan hub 52 and booster 74 with the airflow requirements of the core 34 and rotor circulation control system. The compressed air for the rotor circulation control system is collected in a scroll 78 and passed through a suitable auxiliary duct 80 to the rotor or wherever the compressed air is required. A variable bleed port 82 might also be provided for matching airflow from the booster stage with the requirements of the rotor circulation control system.

The advantages of the embodiment of the convertible engine 73 shown in FIG. 4 is that it can supply all three major power requirements of a convertible engine powered aircraft with a single powerplant. That is to say the engine 73 can provide: first, shaft power for the vehicle rotor to lift the aircraft; second, a fan airflow for thrust to power the aircraft as a jet; and third, compressed air for circulation control of the vehicle rotor.

While two embodiments of the present invention are described in detail, it can be readily appreciated that various changes could be made in the embodiments shown without departing from the scope of the invention.

Therefore having described the preferred embodiment of the invention, though not exhaustive of all possible equivalents, what is desired to be secured by Letters Patent of the United States is claimed below.

What is claimed is:

1. A gas turbine aircraft engine having a compressor, a combustor, a high pressure turbine, a low pressure turbine, and means for transferring power from the low pressure turbine, is provided with apparatus that enables engine operation in either a turbofan or turboshaft mode of operation, said apparatus comprising:
   power transfer means that can be selectively powered by the low pressure turbine to provide power for a turboshaft mode of operation;
   a split fan having an outer portion and an inner portion separated by a rotating shroud, said split fan being powered by the low pressure turbine;
   an inlet guide vane for varying airflow to the outer portion of the split fan for the purpose of increasing airflow through the fan outer portion during the turbofan mode of operation and, when rotated to a substantially closed position, decreasing airflow through the fan outer portion during the turboshaft mode of operation;
   a bypass duct for receiving a bypass airflow accelerated by the fan outer portion; and
   a mixer wherein the bypass airflow is mixed with core engine flow in an engine tailpipe thereby providing fuel consumption improvement during the turbofan mode of operation and further providing increased power output and reduced residual thrust during the turboshaft mode of operation.

2. The engine as recited in claim 1 wherein a compressor inlet duct of the compressor is provided with a bleed valve for selectively directing air flowing from said fan inner portion into the bypass duct for the purpose of matching fan inner portion airflow with engine core airflow requirements.

3. The engine as recited in claim 1 and further comprising an inner variable inlet guide vane for varying airflow to the inner portion of the split fan.

4. The engine as recited in claim 1 and further comprising a booster stage in a compressor inlet duct, said booster stage being powered by said low pressure turbine shaft and being provided for the purpose of further compressing airflow from said inner portion to properly match engine compressor requirements.

5. The engine as recited in claim 4 and further comprising a scroll for directing a portion of the airflow from said booster stage into an auxiliary duct to provide compressed air for additional aircraft power requirements.

6. The engine as recited in claim 5 and further comprising a bleed port for selectively directing an airflow from said scroll into an engine bypass duct.

7. The engine as recited in claim 6 and further comprising an inner variable inlet guide vane to vary the airflow into the fan inner portion.

8. A gas turbine engine having a fan, a compressor, a core engine including a combustor and a high pressure turbine, a low pressure turbine, means for transferring power from the low pressure turbine, a bypass duct for directing air from the fan to bypass the core engine is provided with apparatus that enables engine operation in either a turbofan or turboshaft mode of operation, said apparatus comprising:
   a power transfer means that can be selectively powered by the low pressure turbine to provide power for a turboshaft mode of operation;
   a rotating shroud on said fan for dividing said fan into an outer portion for accelerating a bypass airflow through the bypass duct and an inner portion for supercharging air to be compressed by the compressor for the core engine;

an inlet guide vane for varying airflow to the outer portion of the fan for the purpose of increasing the airflow through the fan outer portion during the turbofan mode of operation and, when rotated to a substantially closed position, decreasing airflow through the fan outer portion during the turboshaft mode of operation;

a tailpipe with a mixer for mixing the bypass flow with core engine exhaust flow;

a compressor inlet duct provided with a bleed valve for selectively directing air into the bypass duct for the purpose of matching fan inner portion airflow to engine core airflow requirements.

9. The engine as recited in claim 8 and further comprising:

a booster stage in the compressor inlet duct, said booster stage being provided for the purpose of further compressing airflow from said inner portion to properly match core engine compressor requirements;

a scroll for directing a portion of the airflow from said booster stage into an auxiliary duct to provide compressed air for additional aircraft power requirements.

10. A convertible gas turbine engine comprising:

a gas generator;

a low-pressure turbine effective for extracting power from said gas generator;

a split fan having radially inner and outer portions separated by a rotatable shroud, said fan being connected to said low-pressure turbine for rotation therewith;

a power transfer shaft connected by power transfer means to said low-pressure turbine for rotation therewith;

variable inlet guide vanes effective for varying air flow to said fan outer portion;

a bypass duct effective for channeling bypass airflow from said fan outer portion to a position downstream of said low-pressure turbine; and a mixer effective for mixing said bypass airflow with exhaust flow from said gas generator;

said gas turbine engine being operable in:

a turbofan mode of operation wherein said inlet guide vanes are positioned to allow airflow through said fan outer portion, said bypass duct and said mixer for loading said fan to generate thrust; and a turboshaft mode of operation wherein said inlet guide vanes are rotated to a substantially closed position to reduce airflow through said fan outer portion, said bypass duct and said mixer for reducing the load on and thrust from said fan and thereby permitting a majority of output power to be transferred to said power transfer shaft.

11. A convertible gas turbine engine according to claim 10 wherein said power transfer means comprises a bevel gear set.

* * * * *

UNITED STATES PATENT AND TRADEMARK OFFICE
CERTIFICATE OF CORRECTION

PATENT NO. : 4,791,783

DATED : December 20, 1988

INVENTOR(S) : Robert E. Neitzel

It is certified that error appears in the above-identified patent and that said Letters Patent is hereby corrected as shown below:

In Claim 1, column 6, line 5, after "pressure turbine," add --including a low pressure turbine shaft connected thereto,--.

In Claim 1, column 6, line 11, after "a" add --nonvariable--.

In Claim 1, column 6, line 11, after "fan" add --connected to the low pressure turbine shaft and--.

In Claim 1, column 6, line 14, after "an" add --outer--.

In Claim 1, column 6, line 14, after "vane" add --disposed upstream of the split fan--.

In Claim 1, column 6, line 14, after "airflow" add --only--.

In Claim 1, column 6, lines 23 and 24, delete "core engine flow" before "in" and substitute -- exhaust flow from said low pressure turbine-- therefor.

In Claim 1, column 6, line 24, after "tailpipe" add --,--.

In Claim 8, column 6, line 55, after "having a" add --nonvariable--.

In Claim 8, column 7, line 3, after "an" add --outer--.

In Claim 8, column 7, line 3, after "vane" add --disposed upstream of the fan--.

In Claim 8, column 7, line 3, after "airflow" add --only--.

In Claim 10, column 8, line 1, after "a" add --nonvariable--.

In Claim 10, column 8, line 8, after "variable" add --outer--.

In Claim 10, column 8, line 8, after "vanes" add --disposed upstream of said fan and--.

In Claim 10, column 8, lines 8 and 9, delete "air flow" before "to" and substitute --airflow only-- therefor.

UNITED STATES PATENT AND TRADEMARK OFFICE
CERTIFICATE OF CORRECTION

PATENT NO. : 4,791,783
DATED : December 20, 1988
INVENTOR(S) : Robert E. Neitzel It is certified that error appears in the above-identified patent and that said Letters Patent is hereby corrected as shown below:

In Claim 10, column 8, line 12, after ";" delete "and".
In Claim 10, column 8, line 14, after ";" add --and--.
In Claim 10, column 8, after line 14 and before line 15, add paragraph:
--a fixed exhaust nozzle in flow communication with said bypass duct and said low pressure turbine for discharging bypass airflow and exhaust flow mixed by said mixer, whereby said exhaust nozzle has a fixed area and is not variable.--

Signed and Sealed this

Twenty-third Day of October, 1990

Attest:

HARRY F. MANBECK, JR.

*Attesting Officer*   *Commissioner of Patents and Trademarks*